UNITED STATES PATENT OFFICE.

SIEGMUND JACOBS, OF CICERO, ILLINOIS, ASSIGNOR OF ONE-THIRD TO CHARLES PETRASEK, OF CICERO, ILLINOIS.

LIQUID COATING COMPOSITION.

1,229,964.      Specification of Letters Patent.      Patented June 12, 1917.

No Drawing.      Application filed September 21, 1916. Serial No. 121,506.

*To all whom it may concern:*

Be it known that I, SIEGMUND JACOBS, a citizen of the United States of America, residing at Cicero, in the county of Cook and State of Illinois, have invented a new and useful Improvement in Liquid Coating Compositions, of which the following is a specification.

My present invention relates to an improved liquid coating composition, having the nature of a rubber paint, and particularly in a newly discovered paint oil to be used with the paint pigments for producing a flat finish for the coating composition.

The primary object of the invention is the provision of a liquid coating composition or paint possessing a flat finish, which may be produced at a comparatively inexpensive cost as to material and labor, and may be spread with unusual capacity, which is at the same time durable, and which may be used either for interior or exterior work.

The invention consists primarily in the new formula for the liquid portion of the paint and in its combination with the pigment formula of the composition, as will be hereinafter more fully disclosed.

In the following specification and claims I have illustrated one complete example of the production of my improved liquid formula, and its combination with the pigment formula, prepared according to the steps required in the process of making the composition, and this example has proven highly satisfactory in actual practice, for both interior work and exterior work.

For the liquid formula of my composition or paint, forming the paint oil which is to be incorporated with the paint pigments, I utilize

| | |
|---|---|
| Pará rubber | 2 ounces, |
| Gasolene (refined) (1 quart) | 32 " |
| Rock mineral oil (petroleum) (1 qt.) | 32 " |
| Turpentine oil (7 quarts) | 224 " |

The crude Pará rubber is dissolved by the solvent gasolene, and then the solution is diluted by the mixture therewith of the petroleum, after which the turpentine is incorporated by gradually adding the diluted solution to the turpentine while simultaneously heating and stirring, until the parts are properly combined.

For the pigment formula I utilize-

| | |
|---|---|
| Raw linseed oil (9 pints) | 144 ounces. |
| China wood oil varnish (3 pts.) | 48 " |
| White lead | 3 " |
| Red lead | 2 " |
| Sulfate of zinc | 1 " |
| Lead acetate | 1 " |

In preparing these ingredients, the raw linseed oil and China wood oil are combined and heated to a temperature of approximately 250°, for about thirty (30) minutes, after which the four ingredients, in dry form, white lead, red lead, sulfate of zinc and lead acetate, are added. Preferably these dry ingredients are first inclosed in a cloth before adding to the boiled oils, and not pressed during the heating, in order to avoid coloring of the oil. After this mixture has been allowed to cool to about 150°, it is poured into the vehicle made as described above, preferably slowly and gradually, and the combined mixtures are gently stirred in a vessel until the whole is thoroughly incorporated and combined, and then it is permitted to stand for a certain time to clear.

The composition thus produced is especially well adapted for use where a flat finish is desired on plastered surfaces, all kinds of canvases, and for wood work, and while the composition is particularly adapted for interior work, it may also be used to advantage on exterior work.

In using the coating composition on new or old plaster walls, a separate priming coat is not necessary, but instead a first or body coat of my composition is laid on, and as the composition flows out even and smooth, it presents a surface free from defects or brush marks, so that a second coat of the same consistency may be added as the finishing coat. Thus the work is accomplished with a body coat and finishing coat of the same consistency, and the necessity for priming, and also for stippling the plastered wall is eliminated, thus saving both time and labor on the work.

I find in actual use that my composition possesses unusual spreading capacity, as for instance when laid on as the first or body coat on plaster walls, one gallon will cover 700 to 750 square feet of surface, and the second or finish coat will cover from 800 to 850 square feet of surface per gallon.

If the liquid formula for oil is mixed with say 100 pounds of pure white lead ground in linseed oil, it will produce approximately eight gallons of flat oil paint with a good covering body.

What I claim is:—

1. A paint oil comprising Pará rubber 2 ounces; gasolene 32 ounces; petroleum 32 ounces; and oil of turpentine 224 ounces.

2. A liquid coating composition comprising Pará rubber, gasolene, petroleum, oil of turpentine, linseed oil, China wood oil, white lead, red lead, sulfate of zinc, and lead acetate.

In testimony whereof I affix my signature.

SIEGMUND JACOBS.